Aug. 29, 1939.  E. L. MASTERS  2,171,067
PLANT SETTER
Filed Feb. 26, 1937
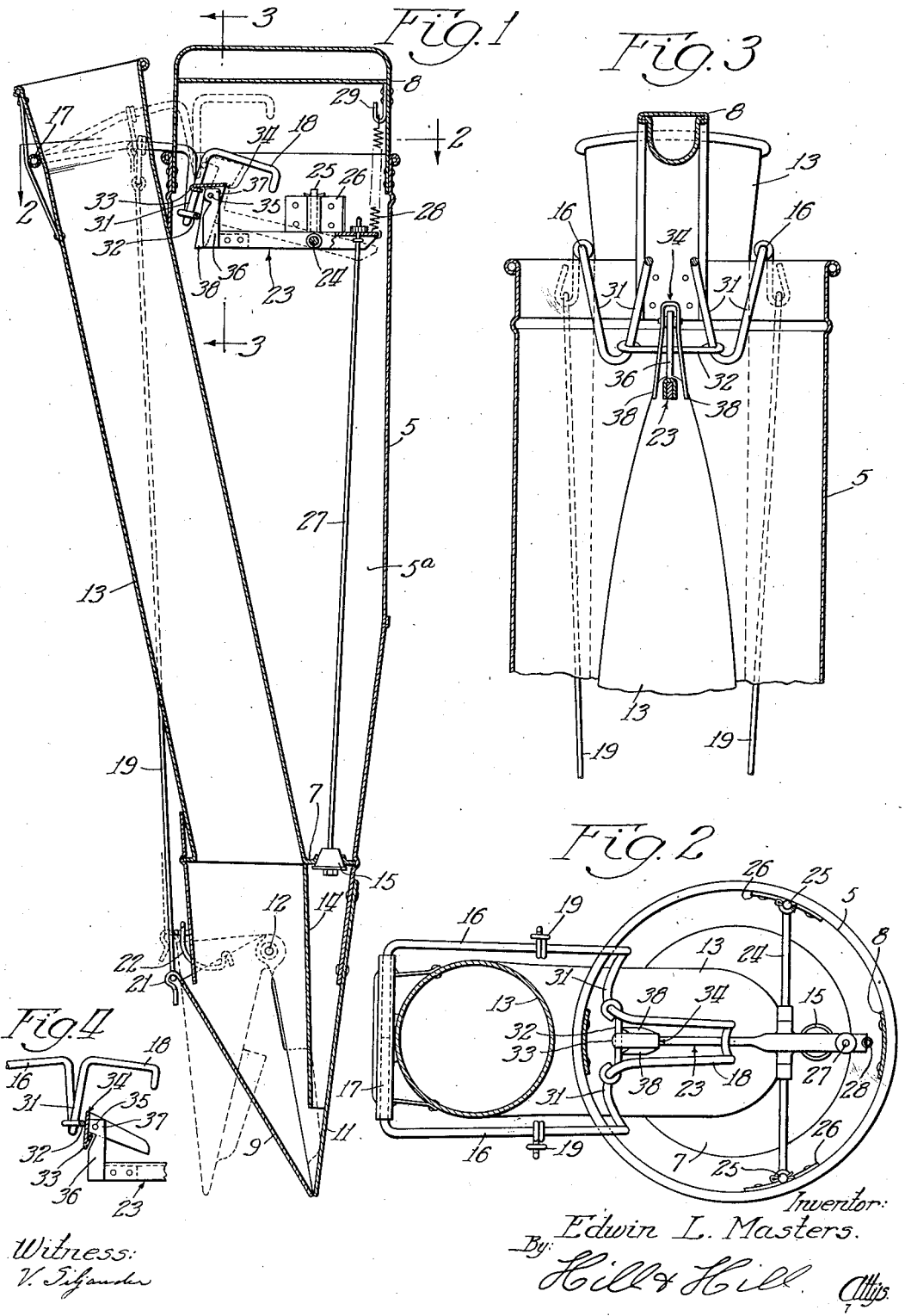
Witness:
V. Silander
Inventor:
Edwin L. Masters.
By Hill & Hill
Attys.

Patented Aug. 29, 1939

2,171,067

UNITED STATES PATENT OFFICE 2,171,067

PLANT SETTER

Edwin L. Masters, Chicago, Ill.

Application February 26, 1937, Serial No. 127,933

5 Claims. (Cl. 111—4)

This invention relates to plant setters, and particularly to a manually operated device adapted for setting or planting tobacco, cabbage, tomato plants and the like, which are usually first grown in hot-beds and later transplanted or set in the field for further and mature development.

One object of the present invention is to provide a novel construction wherein suitable means are employed for operating earth shovels associated with the device, and wherein a novel arrangement of elements is operatively related to said shovel-operating means for depositing water adjacent a plant automatically and simultaneously with the actuating of the shovel operating means to assist in the subsequent or future growth of the plants.

Another object of the invention is to provide a novel construction and arrangement whereby the water valve of the reservoir is automatically opened and closed by a single movement in one direction of the shovel-operating means, and wherein the shovel-operating means may be readily returned to its initial position without interference by the valve operating mechanism.

A further object of the invention is to provide a novel construction and arrangement of the carrying handle, and shovel and valve operating mechanisms whereby the device may be conveniently handled and efficiently operated by one hand and by a single movement thereof.

A still further object of the invention is to improve devices of the character described in sundry details hereinafter referred to and particularly pointed out in the appended claims.

One embodiment of the present invention is shown for illustrative purposes in the accompanying drawing, in which:

Fig. 1 is a vertical sectional elevational view of a plant setter embodying features of the present invention;

Fig. 2 is an enlarged plan sectional view taken substantially as indicated by the line 2—2 of Fig. 1;

Fig. 3 is an enlarged fragmentary sectional elevational view taken substantially as indicated by the line 3—3 of Fig. 1; and Fig. 4 is a fragmentary diagrammatic view of a portion of the mechanism illustrating the operation of various elements forming a part of the present invention.

The illustrative embodiment of the present invention comprises a fluid containing body member or reservoir 5 having an aperture and valve seat 6 formed in the bottom 7 thereof, and provided with a carrying handle 8 adjacent the upper end of the body member.

Adjacent the lower end portion of the body member 5 are a pair of relatively movable cooperating earth shovels 9 and 11, the shovel 11 being shown, in the present instance, as relatively fixed with respect to the body member, and the member 9 being pivotally mounted at 12 on the body member and adapted normally to occupy a position indicated by full lines in Fig. 1, with its lower end portion closely adjacent the shovel 11 for insertion into the ground and adapted to be swung about its pivotal center as indicated by dotted lines in Fig. 1, in a manner to form a recess in the ground adapted to receive a plant inserted therein through a plant tube 13 mounted on or carried by the body member 5 and operatively related to the shovels 9 and 11, the relatively fixed shovel 11 having a partition member or guide wall 14 associated therewith for directing fluid from the body member or reservoir 5 to a point adjacent the lower end of the shovels when a valve 15 operatively related to the valve seat 6 is opened or removed from the valve seat.

For actuating the movable shovel 9, a bifurcated arm 16 is pivotally mounted, preferably, adjacent one of its ends, on the plant tube 13, as indicated at 17, and adapted to straddle the tube as clearly shown in Figs. 2 and 3, the opposite or free end of the arm 16 extending inwardly and provided with a finger piece 18 positioned adjacent and preferably below the carrying handle 8 in a manner to be engaged by the fingers of one's hand used for supporting and carrying the plant setter, the arm 16 being connected, preferably, intermediate its ends to the upper ends of links 19 which in turn are connected adjacent their lower ends to a hook or loop 21 on the movable shovel 9, the connections and arrangement being such that when the arm 16 is swung upwardly to the dotted line position shown in Fig. 2, the shovel 9 is moved to the dotted line position shown in Fig. 1, the shovels 9 and 11 will be separated, thereby forming a recess in the ground to receive a plant from the tube 13, the movable shovel 9 being returned to its normal or full line position by a spring 22 operatively related to a portion of the body member 5 and the movable shovel.

For simultaneously and automatically opening the valve 15 when the shovel 9 is operated by the arm 16 and in a manner to deposit a quantity of water in the recess formed by the shovels 9 and 11, and for closing the valve during the same movement of the arm 16, a valve lever, indicated as a whole by the numeral 23 is shown, in the present instance, as pivotally mounted intermediate its ends on a rod 24 having its end portions 25 secured to the body member by means of brackets 26, one end of the lever 23 being operatively connected by means of a valve rod 27 to the valve 15 in a manner to open the valve when the lever 23 is rocked or moved in a clockwise direction (Fig. 1) and to close the valve when the lever is moved in the opposite or counter-clockwise direction by means of a spring 28 operatively connected to the said end of the lever 23 and to a bracket or hook 29 mounted on, preferably the carrying handle 8.

For operating the valve 15 by movement of the arm 16 in a direction to separate the shovels 9 and 11, the arm 16, in the present instance, is provided with depending portions 31 having a projection or cross-bar 32 mounted thereon and adapted to engage an extended portion 33 of a pawl 34 pivotally mounted at 35 on an upstanding vertically disposed portion 36 on the opposite end of the valve lever 23, the arrangement of the pawl 34 and upstanding portion 36 being such that when the extended portion 33 is engaged by the projection or cross-bar 32, the pawl will be held against rotation in a clockwise direction by a stop portion 37 of the upstanding portion 36 in a manner to cause the valve lever 23 to be rotated on the rod 24 in a clockwise direction to open the valve 15 and discharge a quantity of water from the reservoir 5, the continued movement of the arm 16 causing the projection 32 to pass beyond the end of the extended portion 33 of the pawl 34 in a manner to release the valve lever and permit the spring 28 to restore the lever to its initial position and the valve 15 to its closed position.

Upon returning the arm 16 to its normal position and the projection 32 to a position beneath the extended portion 33, the pawl 34 will yield and be rotated in a counter-clockwise direction under the engaging influence of the projection 32 as illustrated in Fig. 4 and permit the projection 32 to pass to the position shown in full lines in Fig. 1, and for returning the pawl 34 to its normal position and the extended portion 33 into the path of the projection 32 to be again engaged thereby when the arm 16 is again operated, the pawl 34 is provided with downwardly extending side portions or counter-weights 38 which normally maintain the extended portion 33 of the pawl 34 in a position to be engaged by an upward movement of the projections 32 on the arm 16.

It will be observed from the foregoing description that the present invention provides a novel construction and arrangement of the shovel operating means and valve operating means whereby the valve is automatically and simultaneously opened and wherein the valve is automatically closed by the continued movement of the mechanism by which the shovels are operated.

Obviously, the present invention is not limited to the precise construction and arrangement shown and described as the same may be variously modified. Moreover, all the features of the invention need not be used conjointly as the same may be used to advantage in variously different combinations and sub-combinations.

What I claim as new and desire to secure by Letters Patent is:

1. In a plant setter, the combination of a reservoir having a valve therein, a movable shovel mounted adjacent the lower end of said reservoir, a plant tube operatively related to said shovel and reservoir, a valve actuating lever pivotally mounted in said reservoir and operatively related to said valve, a movable arm mounted on said plant tube operatively connected to said shovel and engageable with a portion of said valve lever for actuating the shovel and moving said lever to open said valve, the continued operative movement of said arm beyond a predetermined position acting to disengage the arm from said lever, and means for closing said valve upon disengagement of said arm and lever.

2. In a plant setter, the combination of a reservoir having a valve therein, a carrying handle extending transversely of said reservoir, a movable shovel mounted adjacent the lower end of said reservoir, a plant tube operatively related to said shovel, a valve lever pivotally mounted in said reservoir and operatively related to said valve, a pawl movably mounted on said lever, a pivotally mounted arm having a finger piece positioned in the vertical plane of said handle and extending substantially in the same transverse direction thereof and operatively connected to said shovel, said arm being engageable with said pawl for actuating the shovel and rocking said lever to open said valve, the continued operative movement of said arm acting to move the arm out of engagement with the pawl, and means for returning the lever to its normal position and closing said valve upon disengagement of said arm and pawl.

3. In a plant setter, the combination of a reservoir having a valve therein, a movable shovel mounted adjacent the lower end of said reservoir, a plant tube operatively related to said shovel, a valve operating lever pivotally mounted in said reservoir and connected to said valve, a pawl movably mounted on said lever, means on said valve lever for limiting the movement of said pawl in one direction, an operating arm pivotally mounted on said plant tube and connected to said shovel, means on said arm engageable with said pawl for moving said lever to open the valve and to be disengaged from said pawl when the arm has been moved to a predetermined distance in one direction, and resilient means for returning the valve lever to its normal position and closing said valve, said pawl being adapted to yield to permit the return of said arm to its normal position when the arm is moved in the opposite direction.

4. In a plant setter, the combination of a reservoir having a valve in the lower portion thereof, a plurality of relatively movable shovels mounted adjacent the lower end of said reservoir, a plant tube operatively related to said shovels, a valve operating lever pivotally mounted in said reservoir and operatively connected to said valve, a pawl pivotally mounted on said lever and rotatable thereon within pre-determined limits with respect thereto, an arm pivotally mounted on said plant tube and operatively connected to one only of said shovels, a projection on said arm engageable with said pawl for actuating the valve lever to open said valve simultaneously with the operation of said arm when moved in one direction, said projection being disengaged from the pawl to release the valve lever from the influence of the arm when said arm and projection have been moved beyond a pre-determined position in said direction and with respect to the pivotal center of said lever, and resilient means for closing the valve upon the release of said pawl and lever, said pawl being free to yield under the engaging influence of said projection to permit the passage thereof when said arm and projection are moved in the opposite direction.

5. In a plant setter, the combination with a reservoir having a valve therein adjacent the lower end thereof, a valve lever and actuating arm pivotally mounted on relatively fixed centers of rotation adjacent the upper portion of said reservoir, said lever being operatively connected to said valve, cooperating members supported on said arm and lever, respectively, and positioned normally adjacent a straight line extending through the pivotal centers of said arm and lever, said members cooperating to move said lever and open the valve when said arm is moved in one direction, the movement of said arm in said one direction acting to separate said cooperating members when the arm and lever have been moved beyond a pre-determined position at one side of said line, and means operatively related to said lever for closing the valve and returning the lever to its normal position upon the separation of said cooperating members, one of said cooperating members being movable relatively to its support and adapted to yield under the engaging influence of the other cooperating member when said arm is moved in the opposite direction.

EDWIN L. MASTERS.